Dec. 25, 1928.                    S. B. HASELTINE                    1,696,302
                          FRICTION SHOCK ABSORBING MECHANISM
                                 Filed Feb. 16, 1927
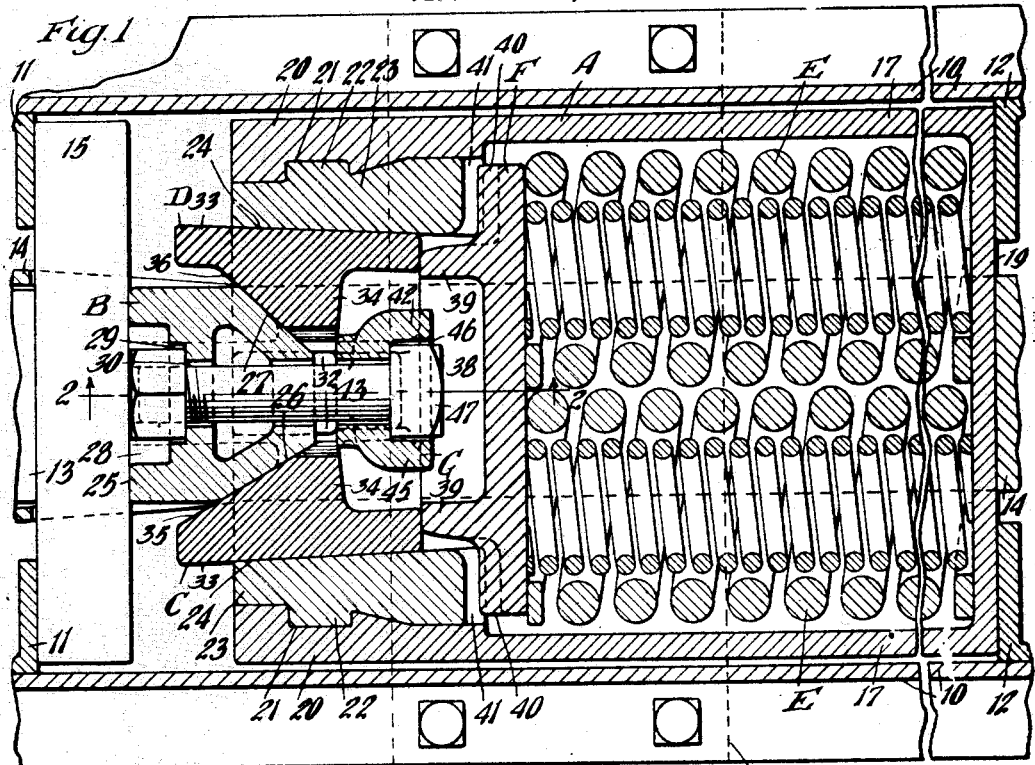
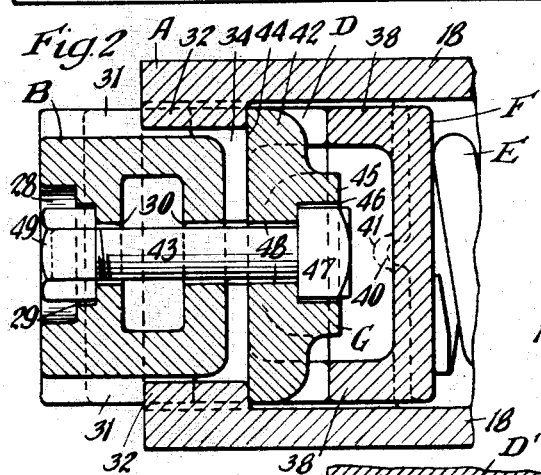
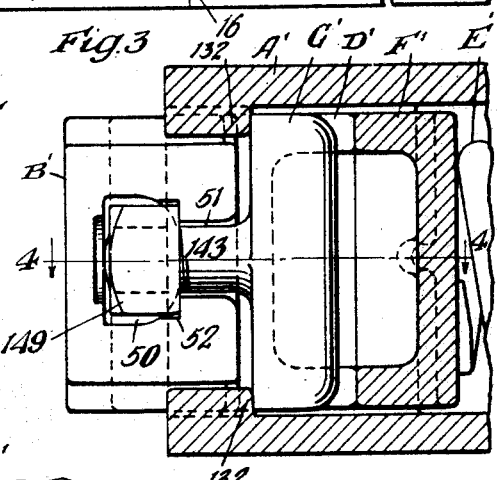
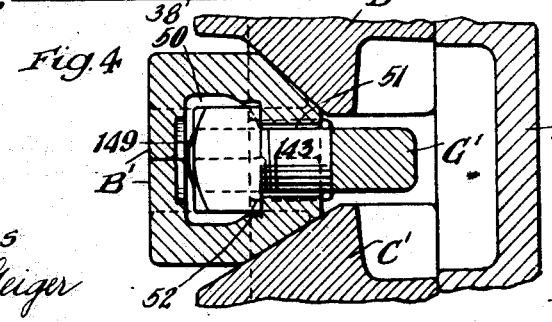
Witness
Wm. Geiger
Inventor
Stacy B. Haseltine
By George I. Haight
His Atty.

Patented Dec. 25, 1928.

1,696,302

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 16, 1927. Serial No. 168,559.

This invention relates to improvements in friction shock absorbing mechanisms.

One object of the invention is to provide a friction shock absorbing mechanism, especially adapted for railway draft riggings, including co-operating relatively movable friction members and wedge means for placing the friction members under lateral pressure, wherein simple and efficient means is provided for anchoring the wedge to the mechanism, thereby holding the parts of the mechanism assembled.

A more specific object of the invention is to provide a friction shock absorbing mechanism of the character indicated, including a wedge member and means for anchoring the wedge means to the mechanism to hold the parts assembled, including a bolt-like element held to the wedge member by means of a nut, wherein means is provided for positively locking the nut against rotation to prevent accidental removal of the same.

Other objects of the invention will more fully and clearly appear from the description and claim hereinafter following.

In the drawing, forming a part of this specification, Figure 1 is a horizontal longitudinal sectional view of a portion of a railway draft rigging illustrating one embodiment of my improvements in connection therewith. Figure 2 is a vertical longitudinal sectional view of the forward end of the shock absorbing mechanism proper illustrated in Figure 1, and corresponding substantially to the line 2—2 of said Figure 1. Figure 3 is a longitudinal sectional view similar to Figure 2, illustrating another embodiment of my invention. And Figure 4 is a horizontal longitudinal sectional view corresponding substantially to the line 4—4 of Figure 3.

In said drawings, 10—10 indicate channel-shaped center or draft sills of a railway car underframe having front stop lugs 11—11 and rear stop lugs 12—12 secured to the inner sides thereof. The inner end of the drawbar is designated by 13, to which is operatively connected a yoke 14 of well known form. The shock absorbing mechanism and a front main follower 15 are disposed within the yoke and the yoke in turn is supported by a detachable saddle plate 16 fixed to the draft sills.

Referring first to the embodiment of the invention illustrated in Figures 1 and 2, the same comprises broadly: A combined spring cage and friction shell A; a wedge block B; a pair of friction shoes C and D; twin arranged spring resistance elements E; spring follower F; and a wedge block retaining means G.

The combined spring cage and friction shell is in the form of a substantially box-like casing having longitudinally disposed vertical side walls 17—17, horizontally disposed spaced longitudinally extending top and bottom walls 18—18, and a transverse vertical end wall 19. The end wall 19 co-operates with the stop lugs 12 in the manner of the usual rear follower. The side walls 17 of the casing A are thickened at the forward end as indicated at 20—20 and these thickened portions are provided with recesses 21—21 adapted to receive projections 22—22 on liners 23—23 mounted within the cage. It will be evident that by this arrangement, the liners are held against longitudinal movement with respect to the cage A. The liners 23 are provided with longitudinally disposed flat inner friction surfaces 24—24. The friction surfaces 24 are preferably converged inwardly of the mechanism. The forward end portion of the spring cage in which the liners 23 are mounted forms the friction shell section proper thereof.

The wedge B is in the form of a block having a flat front end face 25 bearing directly on the inner side of the main follower 15. At the inner end, the wedge block B is provided with a pair of inwardly converging flat wedge faces 26 and 27, the face 26 being disposed at a relatively keen wedge acting angle with respect to the longitudinal axis of the mechanism and the wedge face 27 being disposed at a relatively blunt releasing angle with respect to said axis. The front end of the wedge block B is recessed as indicated at 28 and the bottom of the recess 28 is provided with hexagonal pocket 29 adapted to co-operate with the nut of the retaining means as hereinafter set forth. The wedge block B is also provided with a longitudinal opening 30 extending from the pocket 29 to the rear end of the wedge to accommodate the retaining bolt element of the retaining means G. The top and bottom sides of the wedge block B are longitudinally slotted as indicated at 31 to accommodate inwardly projecting lugs 32 at the front end of the combined friction shell and spring cage. The lugs 32 are herein shown as formed integral with the top and bottom walls 18 of the casing A, but it will be evident that the same may be formed in any suitable manner.

The friction shoes C and D are disposed at opposite sides of the mechanism and are interposed between the wedge block B and the friction surfaces 24 of the friction shell. The two friction shoes are of similar design, except as hereinafter pointed out. Each shoe is provided with a longitudinally disposed flat outer friction surface 33 adapted to co-operate with the friction surface 24 of the corresponding liner. On the inner side, each shoe is provided with an enlargement 34 having a wedge face at the forward end thereof, the wedge face of the friction shoe C being designated by 35 and adapted to co-operate with the wedge face 26 of the block B and correspondingly inclined thereto, and the wedge face on the shoe D being designated by 36 and adapted to co-operate with the wedge face 27 of the block B and correspondingly inclined thereto.

The main spring resistance E comprises twin arranged sets of springs, each set comprising a relatively light inner coil and a heavier outer coil. The coils of each set have their opposite ends bearing respectively on the end wall 19 of the casing A and the spring follower F.

The spring follower F is in the form of a substantially heavy rectangular plate-like member having horizontally disposed top and bottom flanges 38—38 and vertically disposed flanges 39—39 forwardly projecting therefrom. The flanges 38 and 39 bear directly on the inner ends of the friction shoes C and D. Outwardly of the flanges 39, the plate-like body portion of the spring follower G is provided with horizontal ribs 40 co-operating with grooves 41 at the inner ends of the liners.

The retaining element G comprises a vertically disposed bar-like element 42 having a forwardly projecting retainer bolt 43 anchored thereto. The bar-like section 42 has a flat front end face 44 adapted to engage the inner ends of the lugs 32 on the casing A, thus positively limiting outward movement of the bar. The central portion of the bar 42 is thickened as indicated at 45 and this thickened portion is provided with an angular socket 46 adapted to receive the head 47 of the bolt 43. The head of the bolt 43 is preferably of square cross-section and the socket is formed of a similar shape so as to snugly receive the head 47 of the bolt and prevent turning of the same. The shank of the bolt extends through an opening 48 in the bar 42 and through the bore 30 of the wedge block B. The nut of the bolt which is indicated by 49 is threaded on the outer end thereof and is disposed within the recess 28 of the wedge block, the inner end of the nut being seated within the pocket 29. The nut 49 is of hexagonal shape so as to correspond with the pocket 29 and is adapted to snugly fit the same so that the nut will be locked against rotation with respect to the bolt when the parts are in the assembled position shown in Figures 1 and 2. The recess 28 and the pocket 29 of the wedge block B are of such depth that the nut 49 will be housed entirely therein and will be held against outward movement with respect to the pocket 29 by engagement with the inner face of the main follower 15. It will be evident that inasmuch as the main follower 15 is at all times during the compression of the mechanism in engagement with the outer end of the wedge block B, the nut will always be held seated in the pocket 29 during operation of the mechanism. Rotation of the retaining element G is prevented by the shoes between which it is interposed.

In addition to holding the wedge block B assembled with the mechanism, the retainer bolt 43 also serves to hold the spring resistance elements E under initial compression. By placing the spring resistance means under initial compression, compensation for wear of the various friction and wedge faces is had, due to the spring follower F being normally urged outwardly, thereby tending to force the friction shoes C and D outwardly also.

In assembling the mechanism, the main spring resistance and spring follower F are first inserted within the casing. The liners are then placed in position, the retaining element G, with the retainer bolt anchored thereto, is then placed in position, and the friction shoes inserted. The mechanism is then placed under compression with the wedge entered between the friction shoes and the parts are then secured by the nut 49 of the retainer bolt. After the parts have been thus assembled, the pressure is removed and the wedge block B permitted to move outwardly so that the inner end of the nut 49 will be seated within the pocket 29, thereby locking the nut against rotation and accidental removal from the bolt.

It should be noted that the bolt normally does not extend beyond the outer end of the nut, but terminates short of the outer face thereof, thus permitting for adjustment of the parts of the mechanism.

The operation of my improved shock absorbing mechanism, assuming a compression stroke, is as follows: The combined friction shell and spring cage A and the main follower 15 will be moved relatively toward each other, thereby forcing the wedge inwardly of the casing, carrying the friction shoes inwardly therewith and also placing the same under lateral pressure. Inward movement of the friction shoes is resisted by the main springs E. This action will continue either until the actuating force is reduced, or the front main follower 15 comes into engagement with the outer end of the casing A. When movement of the follower 15 is arrested by the casing A, the actuating force will be transmitted directly through the casing, the latter acting as a solid column load transmitting member to prevent the main springs E from being unduly compressed. As will be evident during the entire compression stroke of the mechanism, the nut 49 of the bolt will be retained within the pocket 29 and held against movement by engagement of the outer end thereof by the follower 15. Although there will be a tendency for the head of the bolt 47 to move outwardly of the pocket 46 of the bar 42, due to the tension on the bolt being lessened by inward movement of the wedge block with respect to the friction shoes and by the bar 42 moving away from the shoulders 32 of the casing A, the head of the bolt will at no time leave the pocket 46 because of the limited amount of clearance between the bar 42 and the inner end of the wedge.

During release of the mechanism, when the actuating force is reduced, the expansive action of the spring resistance elements E forces the spring follower F forwardly, carrying the friction shoes and wedge block therewith until outward movement of the wedge block B is arrested by the retainer bolt 43 which is anchored to the bar 42, the latter being limited in its outward movement by engagement with the lugs 32 of the casing A.

Referring next to the embodiment of the invention illustrated in Figures 3 and 4, the mechanism is substantially the same as that hereinbefore described, with the exception that the retaining element G' and the wedge member B' thereof are of different construction.

The friction casing A', the spring resistance elements E' and the spring follower F' are of identical design with the corresponding elements hereinbefore described in connection with Figures 1 and 2, and the casing A' is preferably provided with liners similar to the liners 23 hereinbefore described. The friction shoes which are indicated by C' and D' co-operate with the liners and the wedge block B' in a manner similar to the friction shoes C and D and the wedge block B described in connection with Figures 1 and 2. The retaining element G' co-operates with top and bottom stop lugs 132 at the front end of the casing A'. The retaining element G' comprises a vertical bar section having a forwardly projecting stud or bolt-like element 143 formed integral therewith. The front end of the section 143 is threaded to receive a substantially square nut 149. The top and bottom sections of the front edge of the bar portion of the retaining element G' engage behind the lugs 132, thereby positively limiting outward movement of the retaining element.

The wedge block B' comprises two sections having recesses on their inner sides to accommodate the bolt member 143 and the nut 149. The recessed portions of the two sections of the wedge block B' when assembled define an opening 50 in the center of the wedge and a bore 51 communicating therewith and accommodating the shank of the bolt member 143. The inner end of the opening 50 is provided with an angular seat 52 which is of square section to correspond to the inner end of the nut 149. The seat 52 serves to lock the nut 149 against rotation with respect to the bolt member 143, thereby preventing accidental displacement of the nut.

In assembling the mechanism illustrated in Figures 3 and 4, the spring resistance elements E', spring follower F', liners, friction shoes C' and D' and the retaining element G' are inserted within the casing A' in precisely the same manner as described in connection with the embodiment of the invention illustrated in Figures 1 and 2. The nut 149 is then placed on the retaining element G' and the friction shoes forced inwardly of the friction shell until the two sections of the wedge block B' may be engaged over the head 149 of the nut. After the sections of the wedge B' have been assembled in embracing relation with the nut 149, the main springs are allowed to spread, thereby forcing the friction shoes C' and D' into engagement with the wedge block and holding the sections thereof assembled and in engagement with the nut of the retaining member.

As shown in Figure 4, the friction shoes C' and D' and the wedge block B' are provided with co-operating relatively keen and blunt wedge faces similar to the corresponding faces of the shoes C and D and the wedge block B hereinbefore described. It will be evident that although I have shown the interengaging wedge faces of the wedge block and shoes as disposed at different angles with respect to the longitudinal axis of the mechanism, it is within my invention to provide these parts with wedge faces which are all disposed at the same angle with respect to the axis of the mechanism.

The operation of my improved shock absorbing mechanism as illustrated in Figures 3 and 4, is the same as the operation of the device hereinbefore described in connection with Figures 1 and 2.

While I have herein shown and described what I now consider the preferred manner of carrying out my invention, the same is merely illustrative, and I contemplate all changes and modifications that come within the scope of the claim appended hereto.

I claim:

In a friction shock absorbing mechanism, the combination with a friction shell, spring resistance, friction shoes, and wedge; of means for retaining the parts in assembled, desired overall length, said means comprising: a retainer bar disposed within the shell and having shouldered engagement with the latter to limit the outward movement of said bar, a bolt shank threaded in its outer end and extending outwardly from said bar, said bolt shank being maintained against rotation with respect to said bar and having its outer end received within the wedge, and a nut threaded on the outer end of said shank, said wedge having a relatively deep recess of greater diameter than the nut and within which a portion of the latter is normally contained, said wedge having also a relatively shallow socket at the bottom of said recess, said socket conforming to the shape and size of the nut and receiving a portion of the latter therein to prevent rotation of the nut; and means extending over the outer end of the nut to prevent the nut from accidentally becoming unseated from said socket.

In witness that I claim the foregoing I have hereunto subscribed my name this 11th day of February, 1927.

STACY B. HASELTINE.